United States Patent Office 3,812,090
Patented May 21, 1974

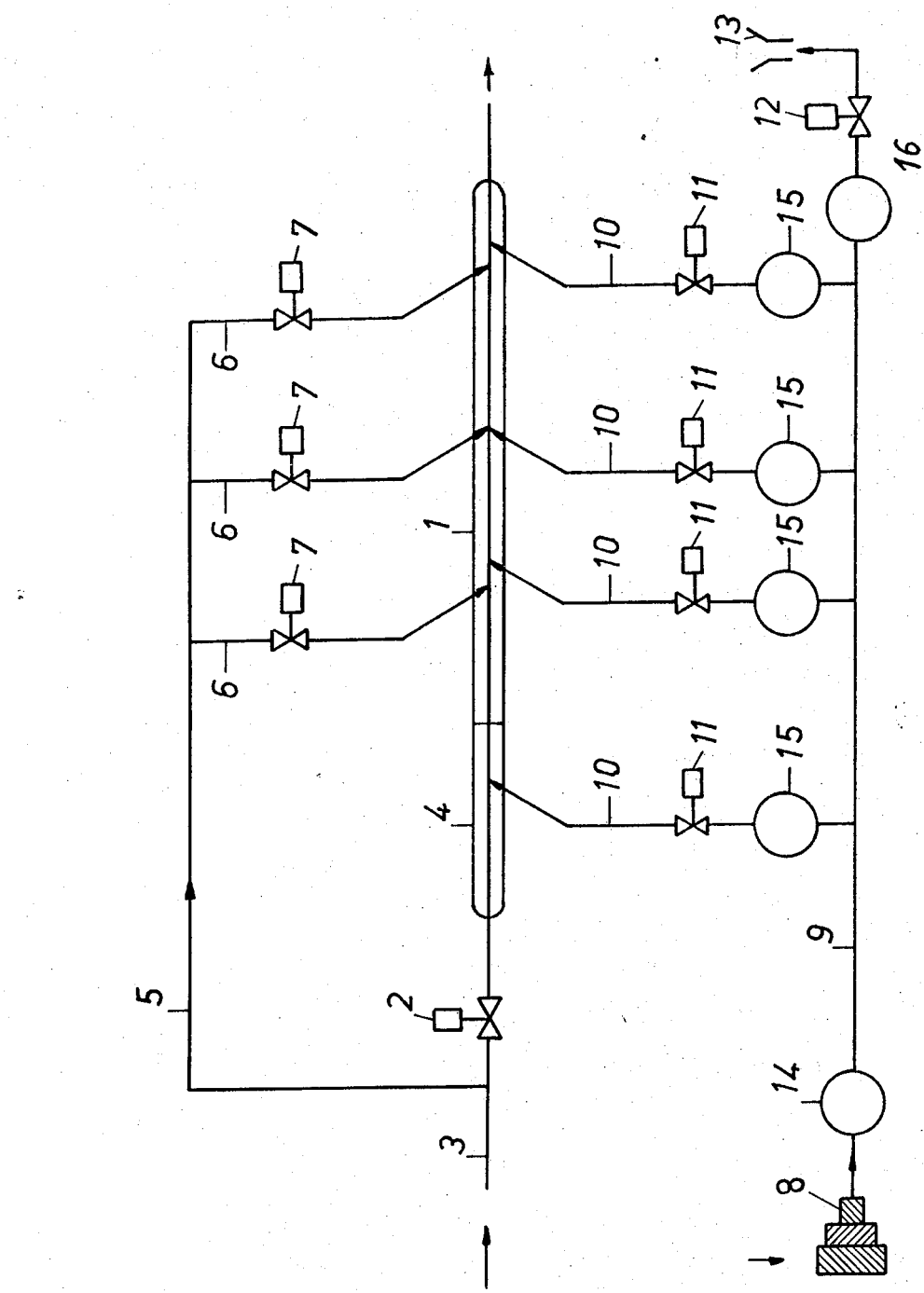

3,812,090
PROCESS FOR PERFORMING GAS-PHASE
REACTIONS UNDER PRESSURE
Henning Peters, Brugge, Germany, assignor to Friedrich
Uhde GmbH, Dortmund, Germany
Filed Aug. 30, 1972, Ser. No. 285,035
Claims priority, application Germany, Apr. 3, 1971,
P 21 16 374.6
Int. Cl. C08f 1/60, 3/04
U.S. Cl. 260—94.9 R  3 Claims

ABSTRACT OF THE DISCLOSURE

A mixture of gaseous initiator and carrier gas is fed directly to a closed reactor, at points suitable for initiating and maintaining the gas-phase reaction in the reactor. The rate of injection of such mixture at each point is controlled in accordance with the temperature in the reactor at such point, to maintain a constant temperature at such point.

BACKGROUND OF THE INVENTION

The present invention relates to a process for performing gas-phase reactions under pressure, for example 2,000 atm., in a tubular reactor provided with an inlet for cold gas and initiator, particularly for high-pressure polymerization processes.

High-pressure polymerization is characterized by the high pressure at which the reaction takes place, by the presence of a reaction initiator, by strong heat generation, by a reaction temperature that is limited to a range between about 140° C. and 350° C. and by a recycling system which serves for returning any unreacted gas to the process. The physical properties and, consequently, the quality of the polymerization product largely depend upon the reaction conditions, especially the polymerization temperature. Therefore, the reaction conditions should be held as constant as possible.

Polymerization of ethylene, for example, is carried out at a pressure of approximately 2,000 atm. in a tubular reactor of a certain definite length. The recycled feed gas, which enters the reactor at the necessary reaction temperature of about 180° C., contains a certain quantity of initiators for starting and maintaining the reaction. Part of the heat liberated by the reaction. is dissipated through a cooling fluid surrounding the tubular reactor while the remainder is used for preheating the cold gas that is introduced into the tubular reactor at one or more points. The addition of cold gas serves to raise the yield and to maintain the permissible narrow temperature range. This procedure is applied to reduce the heat requirements of the overall process; otherwise, the cold gas would have to be preheated outside the reactor. The direct heat exchange with the reaction gas simplifies the process. A relief valve is arranged at the outlet of the reactor to flash the mixture of polymerized product and reaction gas into a separator. During this step the pressure drops to about 300 atm. The gas returns from the separator to the recycle compressor and is fed at about 2,000 atm. into the reactor, together with the feed gas whose pressure has previously been raised by a booster compressor to the suction pressure of the recycle compressor. The initiators may be added in different ways. For example, gaseous oxygen is admitted to the fresh gas, and/or liquid or dissolved oxygen or a suspended peroxide is admitted at one or more points, such as at the cold gas feed points.

It is known that the polymerization temperature can be regulated by controlling the system pressure and by the addition of initiators. Regulation of the inlet pressure is usually avoided because this is practicable only by modifying the discharge volume of the high-pressure compressor. Considering the present plant sizes, discharge volume control of the high-pressure compressor cannot be performed economically. In addition, rates of flow into the reactor of fluids, such as recycle gas and cold gas, should be held constant to maintain steady-state process conditions. Therefore, the pressure is regulated through a relief valve at the outlet of the reactor. The reactor pressure is adjusted for the desired temperature profile by varying the relief rate. Inasmuch as the reaction of high-pressure polymerization is extremely rapid, regulation must be initiated in advance, i.e. in the event of an excessive increase in the temperature, the lowering of the pressure must be initiated before the maximum temperature level is reached. Equipment requirements for this kind of regulation are high. The pressure regulation described above can be supplemented by the addition of initiator. The admixture of controlled quantities of gaseous initiator with the fresh gas ahead of the booster compressor cannot be used for momentary regulation, because the time from the moment of injection into the fresh gas until actual effectiveness in the reactor is too long. Immediate influence can be achieved only by direct addition to the reactor. For this purpose, a liquid initiator is added by means of one or more metering pumps. The points of injection usually serve at the same time for cold gas admission. This combination-type regulation will meet the requirements when the plant is operated at nearly constant pressure. This mode of operation is not possible, however, in the majority of cases. The reaction product tends to adhere to the reactor wall, which causes a reduction of the cross-sectional area and, consequently, causes changes in the volume of the reaction chamber and variations in the heat transfer to the cooling fluid. To break off these adhering reaction products from the reactor wall, the reactor is subjected to periodic pressure drops of several hundred atmospheres. This procedure is called "pulsation." Depending on the throughput, the pulsation procedure is initiated at intervals of one minute, more or less. The pressure drop causes a rapid velocity increase in all lines that have an open connection to the reactor, and a rapid decrease in the density of the recycle gas and cold gas. Because of its low compressibility, a liquid initiator added to the recycle gas and cold gas is subject only to an insignificant reduction in density. Referring to a certain definite quantity of gas this means that an excessive quantity of initiator is added with consequent unwanted changes in the reaction. Therefore, the admission of liquid initiator leads to undesired temperature and, consequently, quality fluctuations. The same applies to the injection of modifiers and co-monomers in the liquid state.

SUMMARY OF THE INVENTION

The object of the invention is to provide a method for the admission of initiators for a gas-phase reaction, to provide immediate effectiveness of changes in the quantity of initiators admitted and to eliminate any influence of pressure changes in the tubular reactor on the metering proportions.

According to the invention, the problem is solved by admitting directly to the tubular reactor controlled quantities of a mixture of gaseous initiator and carrier gas, said admission being performed at points suitable for initiating and maintaining the reaction.

According to another feature of the invention, the reactor receives controlled quantities of a gaseous modifier (also called chain-transfer agent), either separately or combined with initiator, mixed with a carrier gas, the admission being performed at points suitable for maintaining the reaction.

According to another feature of the invention, metering of the initiator and/or modifier-gas mixture is performed by control valves.

The invention provides the particular advantages that the reaction temperature is regulated instantaneously through the controlled admission of initiator and/or modifier and that pressure fluctuations in the tubular reactor have no influence on the metering proportions. The temperature profile remains unaffected by pressure changes so that the quality of the product remains unchanged. It is another advantage of the invention that the regulating gas mixture need not necessarily be admitted at the points of cold gas admission. No provision need be made for a mixing section for the initiator, as would be required for the admission of a liquid initiator.

BRIEF DESCRIPTION OF THE DRAWING

The drawing is a diagram of an apparatus for performing the process of the present invention.

DESCRIPTION OF THE PREFERRED EMBODIMENT

A tubular reactor 1 of an ethylene high-pressure polymerization plant is arranged down-stream from a valve 2. This valve 2 serves for diverting the entire cold gas stream 5 from the main gas stream in a recycle gas line 3 ahead of a preheater 4. The cold gas line is split up into several branches 6, which are connected to the reactor at certain definite points. Through valves 7 in the cold gas line 6, as well as the valve 2, the main gas stream in recycle line 3 is split up in a certain definite ratio, one split stream going to the preheater 4, the other being the cold gas stream 5; the latter can be split up again through valves 7 in a certain definite ratio. The split stream ratios can be varied, with the sum of the split streams being equal to recycle gas flow 3.

A variable-discharge compressor 8 is provided to feed a mixture of carrier gas and initiator to a line 9 that is split up into various branches 10 which are connected to the reactor at certain definite points. The main carrier gas stream in line 9 passes through a flowmeter 14 while the split streams of carrier gas pass through flowmeters 15. Valves 11 provided in carrier gas branch lines 10 serve for regulating the carrier gas split streams in line 10.

Referring to a possible mode of operation of the system, the carrier gas streams are controlled through valves 11, which are regulated by flowmeters 15. Through each flowmeter 15, a certain definite quantity of initiator is fed to a defined point of the reactor 1 together with the carrier gas. Provision is made for a primary controller—not shown in the drawing—for each flowmeter 15, whose input variable is the temperature prevailing at the point of injection of the carrier gas passing through that flowmeter; this controller serves for varying the quantity of carrier gas flowing through a flowmeter 15, in such a way that the temperature is held constant at the point of injection in the reactor 1. The sum of the carrier gas split streams passing through flowmeter 15 is also compared with the main carrier gas stream passing through the flowmeter 14. In the event of a difference between the quantity at 14 and the sum of the quantities at 15, the compressor 8 is regulated in such a way that the difference becomes zero. For a short time, any excess quantity passing through the flowmeter 14 can be sent through a valve 12 to a flare 13, and the compressor discharge capacity can be reduced through the output signal of a flowmeter 16. The flare can be replaced by a return line—not shown in the drawing—for recycling the excess gas to the suction nozzle of the compressor 8. Referring to another mode of operation—not illustrated in the drawing—the split streams 10 can be regulated with the aid of the valves 11 through the temperature change at any suitable point in the reactor. In this case, the discharge capacity of the compressor 8 can be regulated through the pressure in the piping system 9 designed to serve as a surge reservoir. Rapid pressure control can then be achieved through the valve 12 in the way described hereinbefore.

What is claimed is:

1. A process for performing pressure-pulsed gas-phase polymerization of ethylene in a tubular reactor at temperatures between 140° C. and 350° C., comprising the steps of feeding a mixture of gaseous ethylene and gaseous initiator at an inlet of the reactor, feeding at at least one point down-stream from such inlet, as a coolant, a first stream of gaseous ethylene at a temperature and in an amount such as to maintain an optical reaction temperature, wherein the improvement comprises the step of compressing and injecting into the reactor, at at least one point down-stream from such inlet, a second gaseous stream comprising a gaseous initiator, which stream is separate from the gaseous ethylene introduced down-stream from such inlet, and controlling the rate of injection of such second gaseous stream at each point in accordance with the temperature in the reactor at such point, to maintain a constant temperature at such point.

2. A process according to claim 1 wherein the second gaseous stream comprises a carrier gas.

3. A process according to claim 2 wherein the mixture of gaseous initiator and carrier gas contains a gaseous modifier admixed therewith.

References Cited

UNITED STATES PATENTS

| | | | |
|---|---|---|---|
| 3,551,397 | 12/1970 | Rätzsch et al. | 260—94.9 R |
| 3,714,123 | 1/1973 | Mancini et al. | 260—94.9 P |
| 3,725,378 | 4/1973 | Chamberlin | 260—94.9 R |
| 3,405,115 | 10/1968 | Schappert et al. | 260—94.9 R |
| 3,399,185 | 8/1968 | Schappert et al. | 260—94.9 R |

FOREIGN PATENTS

| | | | |
|---|---|---|---|
| 2,089 | 2/1964 | Japan | 260—94.9 R |
| 1,027,524 | 4/1966 | Great Britain | 260—94.9 R |
| 1,238,216 | 4/1967 | Germany | 260—94.9 R |

JOSEPH L. SCHOFER, Primary Examiner

A. HOLLER, Assistant Examiner

U.S. Cl. X.R.

260—94.9 P